United States Patent
Abe et al.

(10) Patent No.: US 9,304,050 B2
(45) Date of Patent: Apr. 5, 2016

(54) TEMPERATURE MEASUREMENT APPARATUS AND METHOD

(71) Applicant: TOKYO ELECTRON LIMITED, Tokyo (JP)

(72) Inventors: Jun Abe, Yamanashi (JP); Tatsuo Matsudo, Yamanashi (JP); Chishio Koshimizu, Yamanashi (JP)

(73) Assignee: TOKYO ELECTRON LIMITED, Tokyo (JP)

( * ) Notice: Subject to any disclaimer, the term of this patent is extended or adjusted under 35 U.S.C. 154(b) by 337 days.

(21) Appl. No.: 14/070,714

(22) Filed: Nov. 4, 2013

(65) Prior Publication Data

US 2014/0056328 A1    Feb. 27, 2014

Related U.S. Application Data

(62) Division of application No. 13/428,870, filed on Mar. 23, 2012, now Pat. No. 8,585,284, which is a division of application No. 12/399,431, filed on Mar. 6, 2009, now Pat. No. 8,144,332.

(60) Provisional application No. 61/050,650, filed on May 6, 2008.

(30) Foreign Application Priority Data

Mar. 10, 2008 (JP) ................................. 2008-059027

(51) Int. Cl.
*G01K 11/00* (2006.01)
*G01B 9/02* (2006.01)
*G01K 11/12* (2006.01)

(52) U.S. Cl.
CPC ............. *G01K 11/00* (2013.01); *G01K 11/125* (2013.01)

(58) Field of Classification Search
CPC ............. G01K 11/00; G01J 1/10; G01J 1/16; G01J 9/02; G01J 3/26
See application file for complete search history.

(56) References Cited

U.S. PATENT DOCUMENTS

| 4,522,495 A | * | 6/1985 | Shajenko ............... G01D 5/266 |
| | | | 250/227.27 |
| 4,948,958 A | | 8/1990 | Sweeney |

(Continued)

FOREIGN PATENT DOCUMENTS

| EP | 1746384 A3 * | 10/2008 | ......... G01B 11/2441 |
| JP | 01009798 A * | 1/1989 | |

(Continued)

OTHER PUBLICATIONS

Korean Office Action issued Oct. 25, 2010, in Patent Application No. 10-2009-0018798 (with English-language translation).

*Primary Examiner* — Gail Kaplan Verbitsky
(74) *Attorney, Agent, or Firm* — Rothwell, Figg, Ernst & Manbeck, P.C.

(57) ABSTRACT

A temperature measurement apparatus includes a light source; a first splitter that splits a light beam into a measurement beam and a reference beam; a reference beam reflector that reflects the reference beam; an optical path length adjustor; a second splitter that splits the reflected reference beam into a first reflected reference beam and a second reflected reference beam; a first photodetector that measures an interference between the first reflected reference beam and a reflected measurement beam obtained by the measurement beam reflected from a target object; a second photodetector that measures an intensity of the second reflected reference beam; and a temperature calculation unit. The temperature calculation unit calculates a location of the interference by subtracting an output signal of the second photodetector from an output signal of the first photodetector, and calculates a temperature of the target object from the calculated location of the interference.

2 Claims, 7 Drawing Sheets

(56) References Cited

U.S. PATENT DOCUMENTS

| | | | |
|---|---|---|---|
| 5,327,219 A * | 7/1994 | Steimle | G01B 9/02059 356/513 |
| 5,381,229 A * | 1/1995 | Murphy | G01K 11/3206 250/227.19 |
| 5,404,224 A * | 4/1995 | Kotidis | G10K 15/046 356/432 |
| 5,645,351 A | 7/1997 | Nakata et al. | |
| 5,755,512 A | 5/1998 | White | |
| 5,963,321 A | 10/1999 | Wang | |
| 6,069,686 A | 5/2000 | Wang et al. | |
| 6,429,023 B1 * | 8/2002 | Gharavi | G01N 21/7703 356/478 |
| 7,006,562 B2 | 2/2006 | Chou | |
| 7,379,189 B2 * | 5/2008 | Suzuki | G01B 11/06 356/503 |
| 7,446,881 B2 | 11/2008 | Suzuki et al. | |
| 7,495,774 B2 | 2/2009 | Hays et al. | |
| 7,505,145 B2 | 3/2009 | Hays et al. | |
| 7,595,886 B2 | 9/2009 | Hirata et al. | |
| 7,801,256 B2 * | 9/2010 | Wingrove | H04B 3/32 375/219 |
| 8,005,238 B2 * | 8/2011 | Tashev | G01S 3/86 367/118 |
| 2005/0036151 A1 | 2/2005 | Gornick et al. | |
| 2006/0176490 A1 | 8/2006 | Suzuki et al. | |
| 2007/0019203 A1 * | 1/2007 | Jansen | G01B 11/2441 356/495 |
| 2007/0133004 A1 | 6/2007 | Duplain et al. | |
| 2012/0140175 A1 * | 6/2012 | Everett | A61B 3/102 351/206 |

FOREIGN PATENT DOCUMENTS

| | | |
|---|---|---|
| JP | 7-306018 A | 11/1995 |
| JP | 2000-105152 A | 4/2000 |
| JP | 2006-112826 A | 4/2006 |
| JP | 2006-220461 A | 8/2006 |
| KR | 20070066376 A * | 6/2007 |
| KR | 100750265 B1 * | 8/2007 |

* cited by examiner

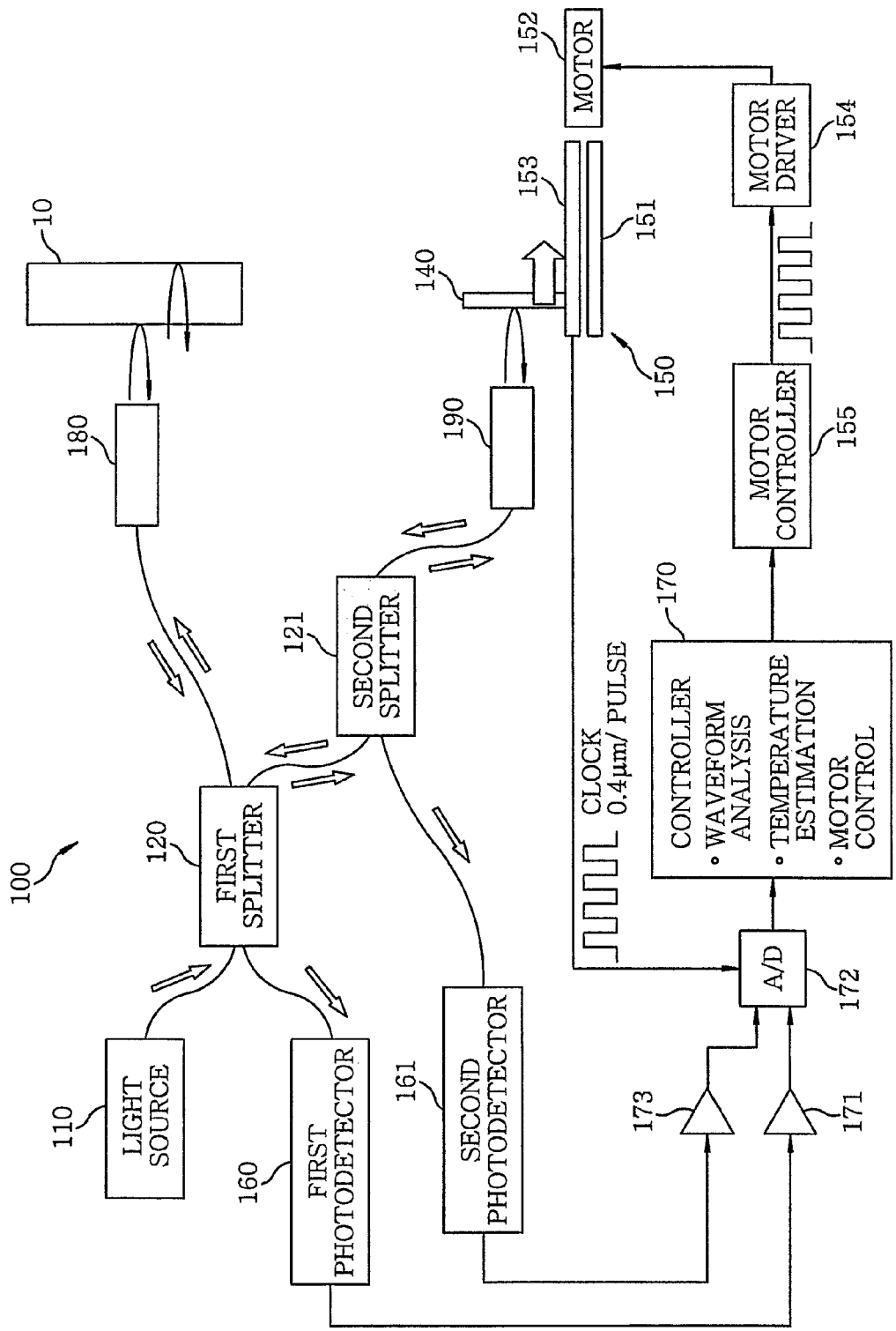

TEMPERATURE MEASUREMENT APPARATUS AND METHOD

CROSS-REFERENCES TO RELATED APPLICATIONS

This application is a divisional application of U.S. application Ser. No. 13/428,870, filed on Mar. 23, 2012, which is a divisional application of U.S. application Ser. No. 12/399,431, filed on Mar. 6, 2009, now U.S. Pat. No. 8,144,332, the entire contents of which are incorporated herein by reference. This application, U.S. application Ser. No. 13/428,870, and U.S. application Ser. No. 12/399,431 claim the benefit of priority to Japanese Patent Application No. 2008-059027, filed on Mar. 10, 2008 and also claim the benefit of U.S. Provisional Application No. 61/050,650, filed on May 6, 2008.

FIELD OF THE INVENTION

The present invention relates to a temperature measuring apparatus and a temperature measuring method capable of accurately measuring a temperature of, e.g., an a front surface, a rear surface and an inner layer of an object such as a semiconductor wafer, a liquid crystal display substrate and the like.

BACKGROUND OF THE INVENTION

In general, accurate measurement of a temperature of a substrate (e.g., a semiconductor wafer) to be processed by a substrate processing apparatus is very important in controlling the shape and property of a film, a hole and the like formed thereon by various processes such as film forming, etching and the like. For this reason, various methods of measuring a temperature of a semiconductor wafer, including a measurement method using a resistance thermometer or a fluorescent thermometer for measuring a temperature of a rear surface of a substrate and the like, have been performed.

In recent years, temperature measurement technology that uses a low-coherence interferometer and enables the direct measurement of the temperature of a wafer, which was difficult in the conventional temperature measurement method, is generally known. The temperature measurement technology using a low-coherence interferometer is configured such that light from a light source is split into measurement beam for temperature measurement and reference beam by a splitter, an interference between reflected measurement beam and the reference beam, which is reflected from a reference beam reflector provided with a driving mechanism for changing an optical path length, is measured, and temperature is measured (see, for example, Japanese Patent Application Publication No. 2006-112826).

In the above-described prior art, the temperature of a wafer can be directly measured through a simple construction. However, the inventors found as a result of detailed investigation that several types of noise are contained in a reference signal received from the reference beam reflector having the driving mechanism for changing an optical path length. For this reason, errors may be caused in detecting the center of gravity of an interference waveform, thus deteriorating the accuracies of an optical thickness measurement and a temperature measurement.

SUMMARY OF THE INVENTION

In view of the above, the present invention provides a temperature measurement apparatus and method, which can measure temperature with higher accuracy than the prior art and can execute substrate processing or the like with higher accuracy and higher efficiency.

In accordance with a first aspect of the present invention, there is provided a temperature measurement apparatus, comprising: a light source; a first splitter that splits a light beam emanated from the light source into a measurement beam and a reference beam; a reference beam reflector that reflects the reference beam; an optical path length adjustor that adjusts an optical path length of the reference beam reflected from the reference beam reflector; a second splitter that splits the reflected reference beam into a first reflected reference beam and a second reflected reference beam; a first photodetector that measures an interference between the first reflected reference beam and a reflected measurement beam obtained by the measurement beam reflected from a target object; a second photodetector that measures an intensity of the second reflected reference beam; and a temperature calculation unit that calculates a location of the interference by subtracting an output signal of the second photodetector from an output signal of the first photodetector, and calculates a temperature of the target object from the calculated location of the interference.

Further, in accordance with a second aspect of the present invention, there is provided a temperature measurement apparatus, comprising a light source; a first splitter that splits a light beam emanated from the light source into a measurement beam and a reference beam; a reference beam reflector that reflects the reference beam; an optical path length adjustor that adjusts an optical path length of the reference beam reflected from the reference beam reflector; a second splitter that splits the reflected reference beam into a first reflected reference beam and a second reflected reference beam; a first photodetector that measures an interference between the first reflected reference beam and a reflected measurement beam obtained by the measurement beam reflected from a target object; a second photodetector that measures an intensity of the second reflected reference beam; a subtraction unit that subtracts an output signal of the second photodetector from an output signal of the first photodetector; and a temperature calculation unit that calculates a location of the interference from a signal obtained by the subtraction of the subtraction unit, and calculates a temperature of the target object from the calculated location of the interference.

Further, in accordance with a third aspect of the present invention, there is provided a temperature measurement apparatus, comprising a light source; a first splitter that splits a light beam emanated from the light source into a measurement beam and a reference beam; a reference beam reflector that reflects the reference beam; an optical path length adjustor that adjusts an optical path length of the reference beam reflected from the reference beam reflector; a photodetector that measures an interference between the reflected reference beam and a reflected measurement beam obtained by the measurement beam reflected from a target object; a shutter unit that electively enables incidence of the reflected measurement beam onto the photodetector; and a temperature calculation unit that stores as a reference signal an intensity change of the reflected reference beam when the reflected measurement beam is not incident onto the photodetector by closing the shutter unit, calculates a location of the interference from a signal obtained by subtracting the reference signal from an output signal of the photodetector when the reflected measurement beam is incident onto the photodetector, and calculates a temperature of the target object from the calculated location of the interference.

Further, in accordance with a fourth aspect of the present invention, there is provided a temperature measurement apparatus, comprising a light source; a first splitter that splits a light beam emanated from the light source into a measurement beam and a reference beam; a reference beam reflector that reflects the reference beam; an optical path length adjustor that adjusts an optical path length of the reference beam reflected from the reference beam reflector; a photodetector that measures an interference between the reflected reference beam and a reflected measurement beam obtained by the measurement beam reflected from a target object; a filter that filters an output signal of the photodetector according to a frequency thereof; and a temperature calculation unit that calculates a location of the interference from the signal filtered by the filter, and calculates a temperature of the target object from the calculated location of the interference.

In the above configuration, it is preferable that the filter is an analog filter or a digital filter.

In the above configuration, it is also preferable that the filter cuts off a frequency component whose frequency is lower than that of a noise caused by operation of the optical path length adjustor.

In the above configuration, it is also preferable that the filter allows a frequency component whose frequency is higher than that of an interference wave between the reflected measurement beam and the reflected reference beam to pass therethrough.

In the above configuration, it is also preferable that the filter passes allows only a frequency band component whose frequency is equal to that of an interference wave between the reflected measurement beam and the reflected reference beam to pass therethrough.

Further, in accordance with a fifth aspect of the present invention, there is provided a temperature measurement method, comprising radiating a reference beam onto reference beam reflector while radiating a measurement beam onto a target object; measuring an interference between the reference beam reflected from the reference beam reflector and the measurement beam reflected from the target object while changing an optical path length of the reflected reference beam by moving the reference beam reflector in one direction; and subtracting a signal, obtained when only the reflected reference beam is detected while the optical path length of the reflected reference beam is changed, from a signal obtained from the interference measurement, calculating a location of the interference by the subtraction, and calculating a temperature of the target object from the calculated location of the interference.

Further, in accordance with a sixth aspect of the present invention, there is provided a temperature measurement method, comprising radiating a reference beam onto reference beam reflector while radiating a measurement beam onto a target object; measuring an interference between the reference beam reflected from the reference beam reflector and the measurement beam reflected from the target object while changing an optical path length of the reflected reference beam by moving the reference beam reflector in one direction; and calculating a location of the interference from a signal obtained by filtering an output signal of the interference measurement according to a frequency, and calculating a temperature of the target object from the calculated location of the interference.

With the above configurations, the present invention can provide a temperature measurement apparatus and method which can measure temperature with higher accuracy than that in the prior art, and can execute substrate processing or the like with higher accuracy and higher efficiency.

BRIEF DESCRIPTION OF THE DRAWINGS

The above features of the present invention will become apparent from the following description of embodiments, given in conjunction with the accompanying drawings, in which:

FIG. 1 is a block diagram showing the schematic construction of a temperature measurement apparatus according to a first embodiment of the present invention;

DETAILED DESCRIPTION OF THE PREFERRED EMBODIMENTS

Figure 2A:
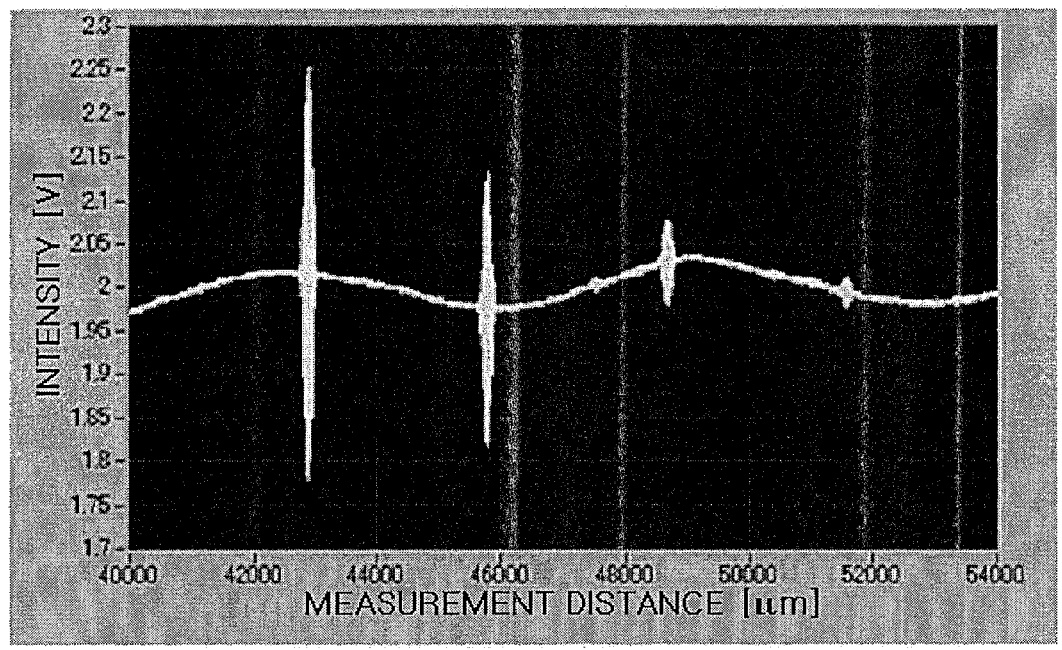
FIGS. 2A and 2B illustrate pictures of interference waveforms between reflected measurement beam and reflected reference beam.

Hereinafter, embodiments of the present invention will be described in detail with reference to the attached drawings. Further, in the present specification and drawings, the same reference numerals are used to designate components having substantially identical functions, and their repeated descriptions will be omitted.

FIG. 1 illustrates the schematic construction of a temperature measurement apparatus 100 according to a first embodiment of the present invention. As shown in FIG. 1, the temperature measurement apparatus 100 includes a light source 110, a first splitter 120, a reference beam reflector 140, an optical path length adjustor 150, and a second splitter 121. The first splitter 120 splits light emitted from the light source 110 into a measurement beam for temperature measurement and a reference beam. The reference beam reflector 140 reflects the reference beam received from the first splitter 120. The optical path length adjustor 150 changes the optical path length of the reference beam reflected from the reference beam reflector 140. The second splitter 121 splits the reflected reference beam from the reference beam reflector 140 into two parts.

The optical path length adjustor 150 includes a linear stage 151, a motor 152, and a He—Ne laser encoder 153 which are configured to move the reference beam reflector 140 such as a reference mirror in one direction parallel to the incident direction of the reference beam. The optical path length of the reference beam reflected from the reference mirror can be adjusted by driving the reference mirror in one direction. The motor 152 is controlled by a controller 170 through a motor controller 155 and a motor driver 154. Further, a signal from the He—Ne laser encoder 153 is converted into a digital signal by an Analog/Digital (A/D) converter 172, and is then input to the controller 170.

Further, the temperature measurement apparatus 100 includes a first photodetector 160 configured to measure an interference between the measurement beam reflected from a target object 10 such as a semiconductor wafer obtained when the measurement beam is radiated onto the target object 10, and one of two reflected reference beams split by the second splitter 121 after the reference beam is radiated onto and reflected from the reference beam reflector 140. Further, the temperature measurement apparatus 100 has a second photodetector 161 for measuring the intensity of the remaining one of the two reflected reference beams split by the second splitter 121.

The kind of light adopted by the light source 110 is not particularly limited, so long as the interference between the measuring beams and the reference beam can be measured. When the temperature measurement of the semiconductor wafer as the temperature measurement object 100 is performed, the light may preferably be chosen such as not to cause an interference between two reflected beams reflected respectively at a front surface of the semiconductor wafer and a rear surface of the semiconductor wafer (the distance therebetween is, typically, about 800 to 1500 µm).

Specifically, it is preferable to use a low coherence light. The low coherence light is a kind of light having a short coherence length. For example, a center wavelength of the low coherence light may preferably be 0.3 to 20 µm; and more preferably, 0.5 to 5 µm. Further, the coherence length may preferably be 0.1 to 100 µm; and more preferably, 3 µm or less. By using the low coherence light for the light source 110, it is possible to avoid problems due to the presence of unwanted interference, and it becomes easier to measure the interference between the reference beam and the measurement beam reflected from a surface or an inner layer of the semiconductor wafer.

The light source using the low coherence light may be a super luminescent diode (SLD), an light emitting diode (LED), a high brightness lamp (a tungsten lamp, a xenon lamp and the like), an ultra-wideband wavelength light source or the like. Among these low coherence light sources, an SLD having a high brightness (whose wavelength is, for example, 1300 nm) may preferably be used as the light source 110.

A 2×2 optical fiber coupler may be used as the first splitter 120. However, the first splitter 120 is not limited thereto, and it is possible to use any device capable of splitting light into a reference beam and a measurement beam. Further, a 2×1 optical fiber coupler may be used as the second splitter 121. However, the second splitter 121 is not limited thereto, and it is possible to use any device capable of splitting reflected reference beam into two parts. Alternatively, an optical waveguide demultiplexer, a semi-transparent mirror and the like may also be employed as the first splitter 120 and the second splitter 121.

The reference beam reflector 140 is implemented using, for example, a reference mirror. For example, a corner cube prism or a planar mirror may be used as the reference mirror. Of these, the corner cube prism is preferably used from the standpoint of the parallelism of reflected light with incident light. However, the reference beam reflector 140 is not limited to this example, and may be implemented using any device capable of reflecting reference beam, for example, a delay line.

As the first and the second photodetectors 160 and 161, photodiodes may be used in consideration of a low price and a good compactness. Specifically, each of the the photodetectors 160 and 161 may be formed of a photodetector (PD) using, for example, a Si photodiode, an InGaAs photodiode, a Ge photodiode and the like. However, without being limited thereto, the photodetector 160 may be constituted of other devices such as an avalanche photodiode, a photomultiplier tube and the like. The detection signal detected by the first photodetector 160 is input to the A/D converter 172 via an amplifier 171, then is converted into a digital signal, and is processed by the controller 170. The detection signal detected by the second photodetector 161 is input to the A/D converter 172 via an amplifier 173, and is converted into a digital signal, and is processed by the controller 170.

The measurement beam from the first splitter 120 is to be transmitted to a measurement beam radiating position, at which the measurement beam is radiated onto the target object 10, via a measurement beam transmission means such as a collimator fiber 180. Further, the reference beam from the first splitter 120 passes through the second splitter 121 to be transmitted to a reference beam radiating position, at which the reference beam is radiated onto the reference beam reflector 140, via a reference beam transmission means such as a collimator fiber 190. Further, the measurement beam transmission means and the reference beam transmission means are not limited to the collimator fibers, and may be implemented as, for example, optical fibers each equipped with a collimator in such a way that the collimator is attached to the front of the optical fiber.

In the temperature measurement apparatus 100, light from the light source 110 is incident on the first splitter 120 and is split into a measurement beam and a reference beam by the first splitter 120. Among these, the measurement beam is radiated onto the target object 10 such as a semiconductor wafer, and is reflected at the front surface or the rear surface of each layer, or the interfaces between the respective layers.

Meanwhile, the reference beam is reflected at the reference beam reflector 140, and the reflected reference beam is incident on the second splitter 121 to be split into two reflected reference beams. Among these, one of the reflected reference beams is incident on the first splitter 120, and is detected by the first photodetector 160 together with the reflected measurement beam. The other of the reflected reference beams is detected by the second photodetector 161.

Further, by scanning the reference beam reflector 140 by the optical path length adjustor 150, an interference waveform shown in FIG. 2A, in which the vertical axis indicates the output level (V) (i.e., the intensity of light) and the horizontal axis indicates the measurement distance (µm) of the reference beam reflector 140, is obtained by the first photodetector 160.

Here, the light source 110 is implemented by the above-described low-coherence light source. Since the coherence length of the light emanated therefrom is short, a strong interference occurs at such locations where the optical path length of the measurement beam is equivalent to that of the reference beam, and interference hardly occurs at the other locations. For this reason, by moving the reference beam reflector 140 to vary the optical path length of the reference beam, the reflected reference beam interferes with the reflected measurement beam reflected from a front and a rear surface of the temperature measurement object 10, and, if inner layers exist therein, from each of the inner layers due to a difference in refractive index.

In the example shown in FIG. 2A, the following sequence is observed as the reference beam reflector 140 is scanned. First, an interference wave appears by the interference between the reflected beam from one surface (the front surface or the rear surface) of the target object 10 and reflected reference beam. Then, another interference wave appears by the interference between the reflected beam from the interface of intermediate layers and the reflected reference beam. Finally, another interference wave appears by the interference between the reflected beam from the other surface (the rear surface or the front surface) and reflected reference beam.

As shown in FIG. 2A, a signal waveform detected by the first photodetector 160 contains interference wave component having a high frequency and a high peak as well as other components whose frequencies are lower than that of the interference wave, and the base line of the signal waveform undulates noticeably regardless of the interference wave.

Figure 3:
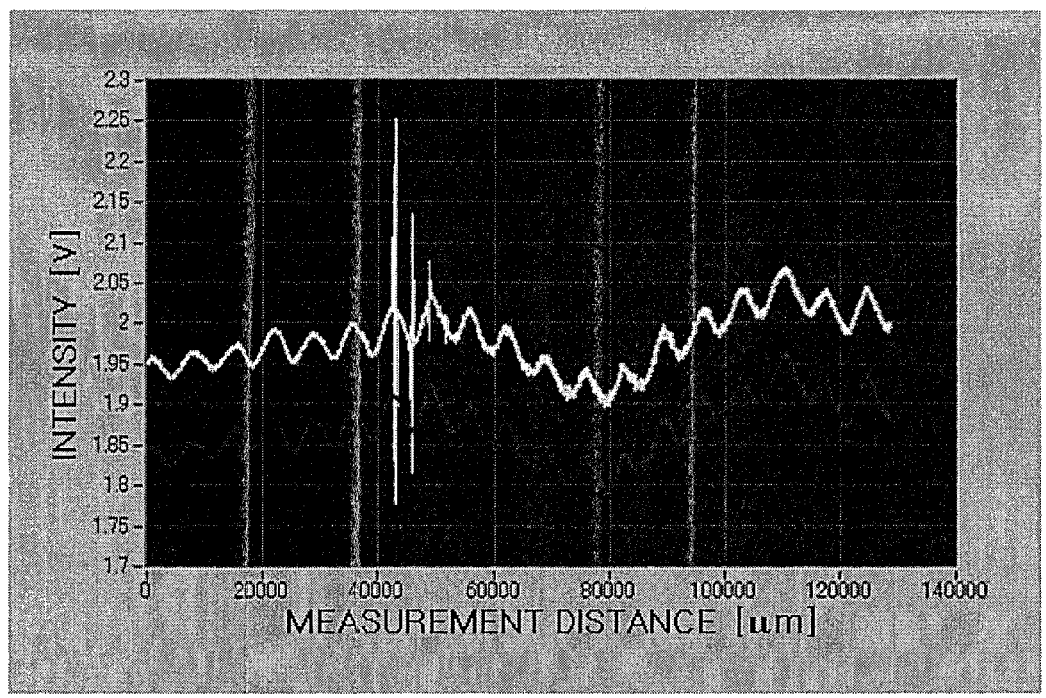
FIG. 3 illustrates an enlarged picture showing the interference waveform between the reflected measurement beam and the reflected reference beam and the waveform of the reflected reference beam.

FIG. 3 illustrates an enlarged view of the detected signal waveform. Of the two waveforms shown in FIG. 3, the upper waveform is a signal waveform detected by the first photodetector 160. As shown therein, the components whose frequencies are lower than that of the interference wave are not single in number, and may contain other components having higher frequencies as well as those observable in FIG. 2A. When components other than the above-described interference wave are contained in the detected signal waveform, an error may occur when obtaining the location of interference based on the center of gravity of the interference wave.

In FIG. 3, the lower waveform is of the reflected reference beam detected by the second photodetector 161. It can be seen therefrom that the components other than the interference wave contained in the signal waveform detected by the first photodetector 160 are originated by the reflected reference beam. Such components are thought to be caused by minute mechanical distortion or a clearance, etc., occurring when the reference beam reflector 140 is scanned by the linear stage 151 in the optical path length adjustor 150.

In view of the above, the present embodiment is configured such that the controller 170 receives (via the amplifier 173 and the A/D converter 172) not only the detected signal coming from the first photodetector 160 but also the detected signal coming from the second photodetector 161, which is obtained at the second photodetector 161 by detecting one of two reflected reference beams output from the second splitter 121. Then, the controller 170 subtracts the signal detected by the second photodetector 161 from the signal detected by the first photodetector 160.

Figure 2B:
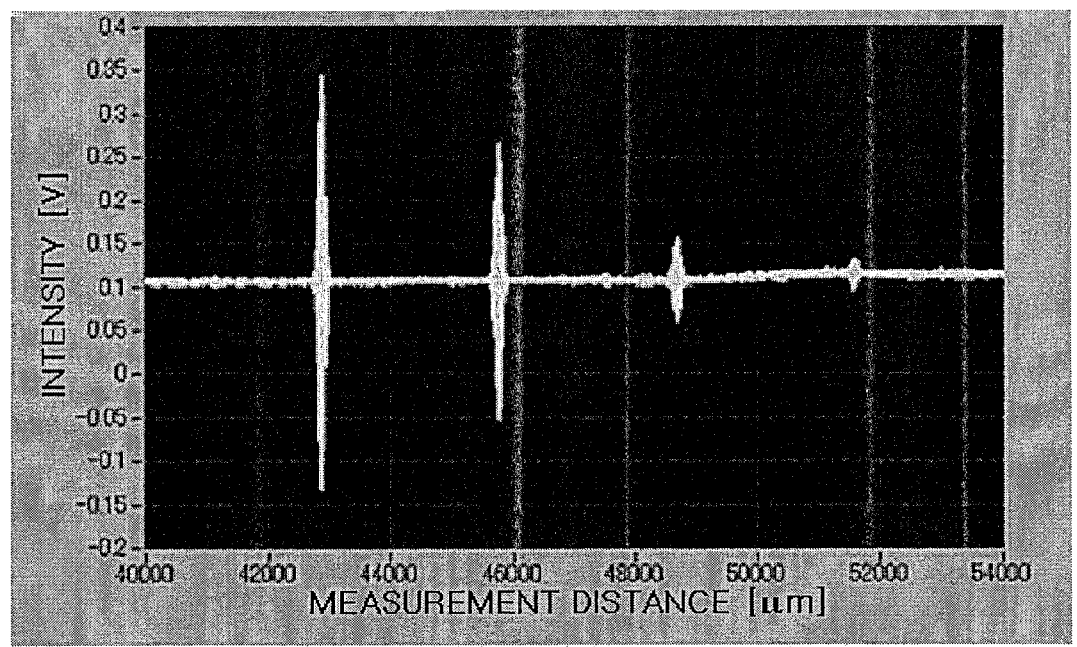

The detected signal waveform obtained after this subtraction is shown in FIG. 2B. As shown therein, the detected signal waveform obtained by subtracting the signal detected by the second photodetector 161 from the signal detected by the first photodetector 160 does not contain the noise component having occurred when the reference beam reflector 140 is scanned by the optical path length adjustor 150. Therefore, on the basis of the detected signal waveform, accurate interference location can be obtained with low error based on the center of gravity of the interference wave; and, on the basis of this interference location, accurate temperature measurement can be performed.

Next, methods of measuring temperature based on an interference wave between measurement beam and reference beam are described below. Temperature measurement methods based on the interference wave include a temperature conversion method that uses, for example, a change in an optical path length corresponding to a temperature change. In the following, a temperature conversion method using a deviation in the location of an interference waveform is described.

When the target object 10 such as the semiconductor wafer is warmed by a heater or the like, the target object 10 is expanded and the refractive index thereof changes. Therefore, the location of an interference waveform is different before and after the temperature change, and the distance between the peaks of the interference waveform also changes. The temperature change can be detected by measuring the distance between the peaks of the interference waveform. In the case of, e.g., the temperature measurement apparatus 100 of FIG. 1, the distance between the peaks of the interference waveform corresponds to the displacement of the reference beam reflector 140. Therefore, the temperature change can be detected by measuring the displacement of the reference mirror corresponding to the distance between the peaks of the interference waveform.

Assuming that the thickness of the target object 10 is d and the refractive index thereof is n, a difference in the peak position of the interference waveform mainly depends on a linear expansion coefficient α of each layer in regard to the thickness d, and on a temperature coefficient β of refractive index change of each layer in regard to the change in the refractive index n. Further, it is also known that the difference in the peak position of the interference waveform also depends on the wavelength in relation to the temperature coefficient β.

Therefore, the thickness d' of the wafer at an arbitrary measurement point after the temperature change can be represented by Equation (1) shown below. In Equation (1), ΔT is the temperature change at the measurement point, α is the linear expansion coefficient, and β is the temperature coefficient of refractive index change. Further, d and n are a thickness and a refractive index, respectively, at the measurement point before the temperature change.

$$d'=d\cdot(1+\alpha\Delta T), n'=n\cdot(1+\beta\Delta T) \quad (1)$$

As shown in Equation (1), the optical path length of the measurement beam passing through the measurement point varies due to temperature change. The optical path length is generally represented by a product of the thickness d and the refractive index n. Therefore, assuming that the optical path length of the measurement beam passing through the measurement point before the temperature change to be L, and that the optical path length at the measurement point after the temperature has varied by ΔT to be L', L and L' are given as shown in the following Equation (2).

$$L=d\cdot n, L'=d'\cdot n' \quad (2)$$

Therefore, by calculating the difference L−L' between the optical path lengths of the measurement beam at the measurement point before and after the temperature change by using Equations (1) and (2), the following Equation (3) is obtained. In Equation (3), a negligible term is omitted in consideration of the relationships α·β ≪ α and α·β ≪ β.

$$L'-L=d'\cdot n'-d\cdot n=d\cdot n\cdot(\alpha+\beta)\cdot\Delta T_1 \quad (3)$$

Here, the optical path length of the measurement beam at the measurement point corresponds to the distance between the peaks of an interference waveform generated by interference between the measurement beam and the reference beam. Therefore, when the linear expansion coefficient α and the temperature coefficient β are known in advance, the distance between the peaks of the interference waveform generated by interference between the measurement beam and the reference beam at the measurement point can be converted into the temperature at the measurement point by measuring the distance between the peaks and applying Equation (3).

In case of interpreting the interference wave into the temperature in the above-discussed manner, it should be noted that the optical path length appearing between the peaks of the interference waveform changes due to the linear expansion coefficient α and the temperature coefficient β as described above, and thus the coefficients α and β need to be obtained in advance.

Generally, the linear expansion coefficient α and the temperature coefficient β of a given material including a semiconductor wafer may be dependent upon the temperature, depending on the temperature range. Since, for example, the linear expansion coefficient α does not change greatly in a temperature range from 0 to 100° C., it may be regarded as a constant. However, in a temperature range of higher than 100° C., the rate of change may increase as temperature increases, depending on the kind of material. In this case, the temperature dependence cannot be negligible. Similarly, the temperature dependence of the temperature coefficient β may also become unnegligible, depending on the temperature range.

In the case of, e.g., silicon (Si) that is used as a main component of the semiconductor wafer, the linear expansion coefficient α and the temperature coefficient β can be approximated as, for example, a quadratic curve in a temperature range from 0 to 500 ° C. As described above, the linear expansion coefficient α and the temperature coefficient β depend on temperature. Accordingly, by obtaining in advance the coefficients α and β as functions of the temperature, and performing temperature conversion based on the values of the coefficients, more accurate temperatures can be acquired.

Further, the temperature measurement method based on an interference wave between a measurement beam and a reference beam are not limited to the above, and may make use of a change in absorption intensity due to a temperature change or combine a change in optical path length and a change in absorption intensity due to a temperature change.

Figure 4:
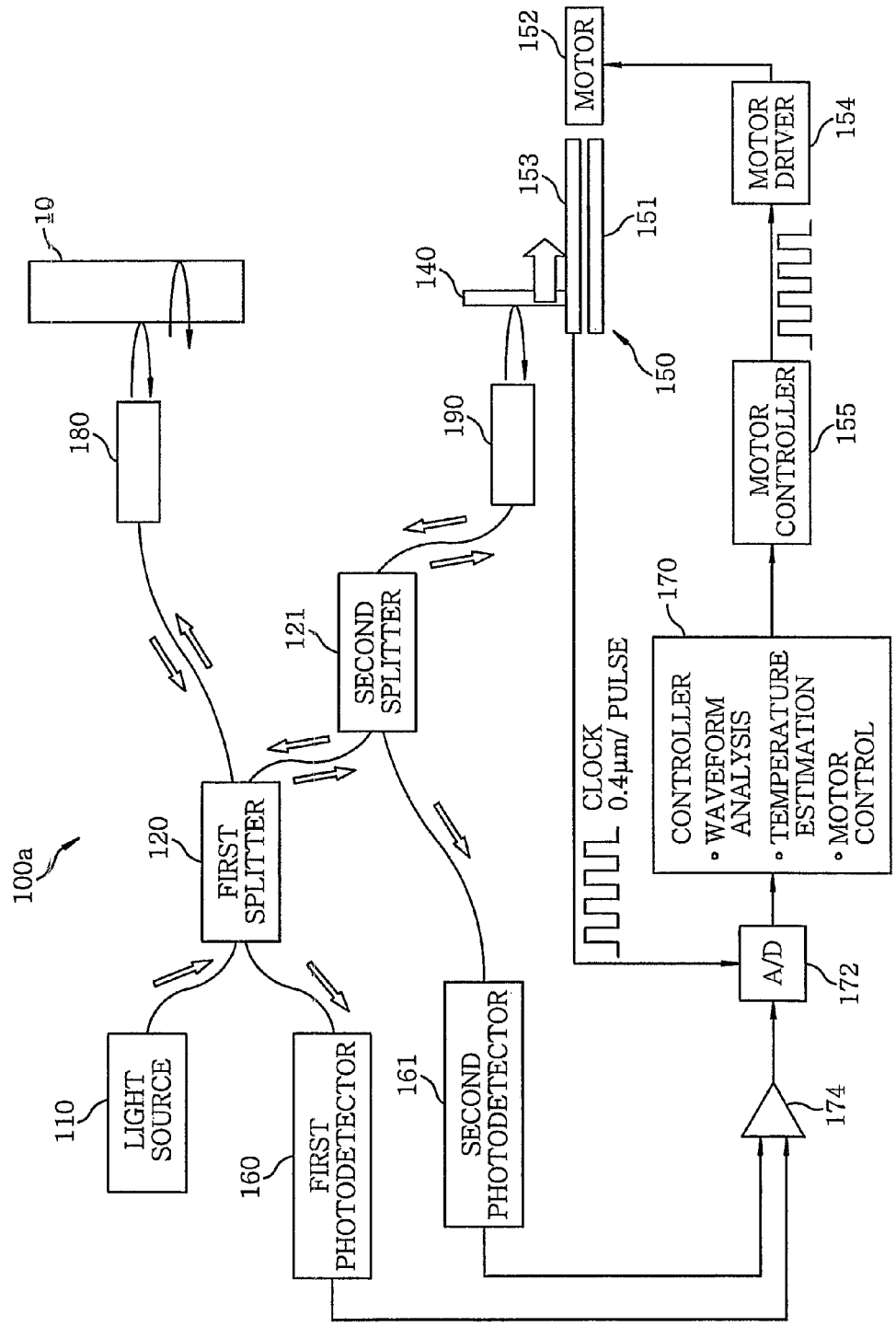
FIG. 4 is a block diagram showing the schematic construction of a temperature measurement apparatus according to a second embodiment of the present invention.

FIG. 4 is a diagram showing a temperature measurement apparatus 100a according to a second embodiment of the present invention. The temperature measurement apparatus 100a is configured such that the outputs of a first photodetector 160 and a second photodetector 161 are input to a differential circuit 174, and the difference therebetween is obtained (by subtraction). Then, the output of the differential circuit 174 is input to a controller 170a via an A/D converter 172. By obtaining the difference between analog signals using the differential circuit 174 in the temperature measurement apparatus 100a, the same effects as those of the first embodiment can be obtained.

Figure 5:
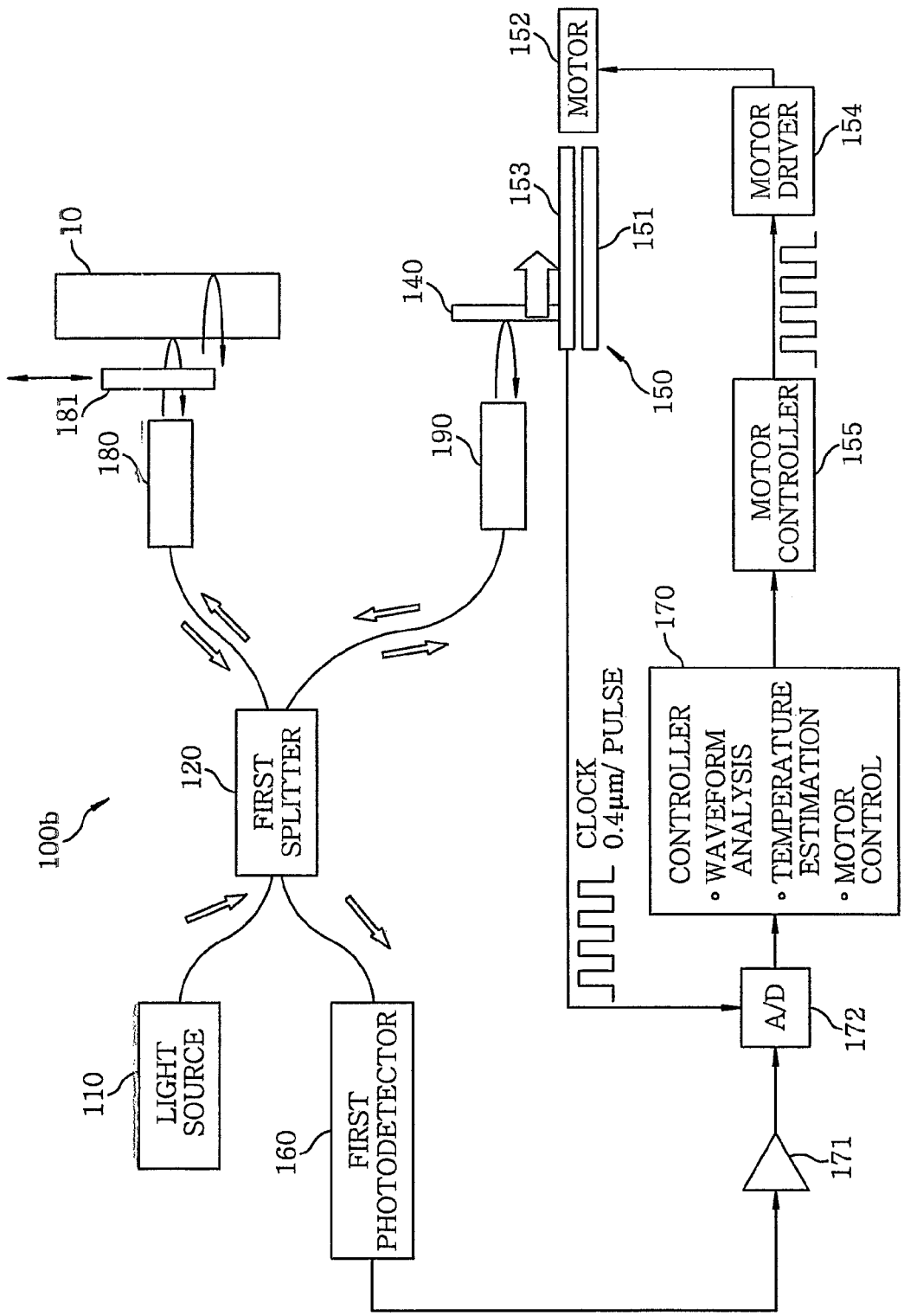
FIG. 5 is a block diagram showing the schematic construction of a temperature measurement apparatus according to a third embodiment of the present invention.

FIG. 5 is a diagram showing the construction of a temperature measurement apparatus 100b according to a third embodiment of the present invention. In the temperature measurement apparatus 100b, instead of providing a second splitter 121 and a second photodetector 161 as in the above embodiments, a shutter unit 181 for electively enabling or disabling the incidence of a reflected measurement beam onto a first photodetector 160 is provided, e.g., between the end of a collimator fiber 180 and a target object 10. Further, the first photodetector 160 is configured to detect only the reference beam reflected from the reference beam reflector 140 by closing the shutter unit 181.

The temperature measurement apparatus 100b detects only a reflected reference beam from the reference beam reflector 140 by closing the shutter unit 181, and stores thus detected data (which is a waveform data shown in the lower portion of FIG. 3) in the controller 170 as reference signal data. When an interference between the reflected measurement beam and the reflected reference beam is detected from the output signal of the first photodetector 160 by opening the shutter unit 181, the controller 170 subtracts the stored reference signal data from the output signal of the first photodetector 160.

The temperature measurement apparatus 100b configured as above can be implemented at a low cost with a relatively simple construction, without having to provide the second splitter 121 and the second photodetector 161 as in the case of the temperature measurement apparatus 100 of FIG. 1. Further, the temperature measurement apparatus 100b can measure temperature with a higher accuracy by eliminating noise components occurring due to the operation of the optical path length adjustor 150.

Figure 6:
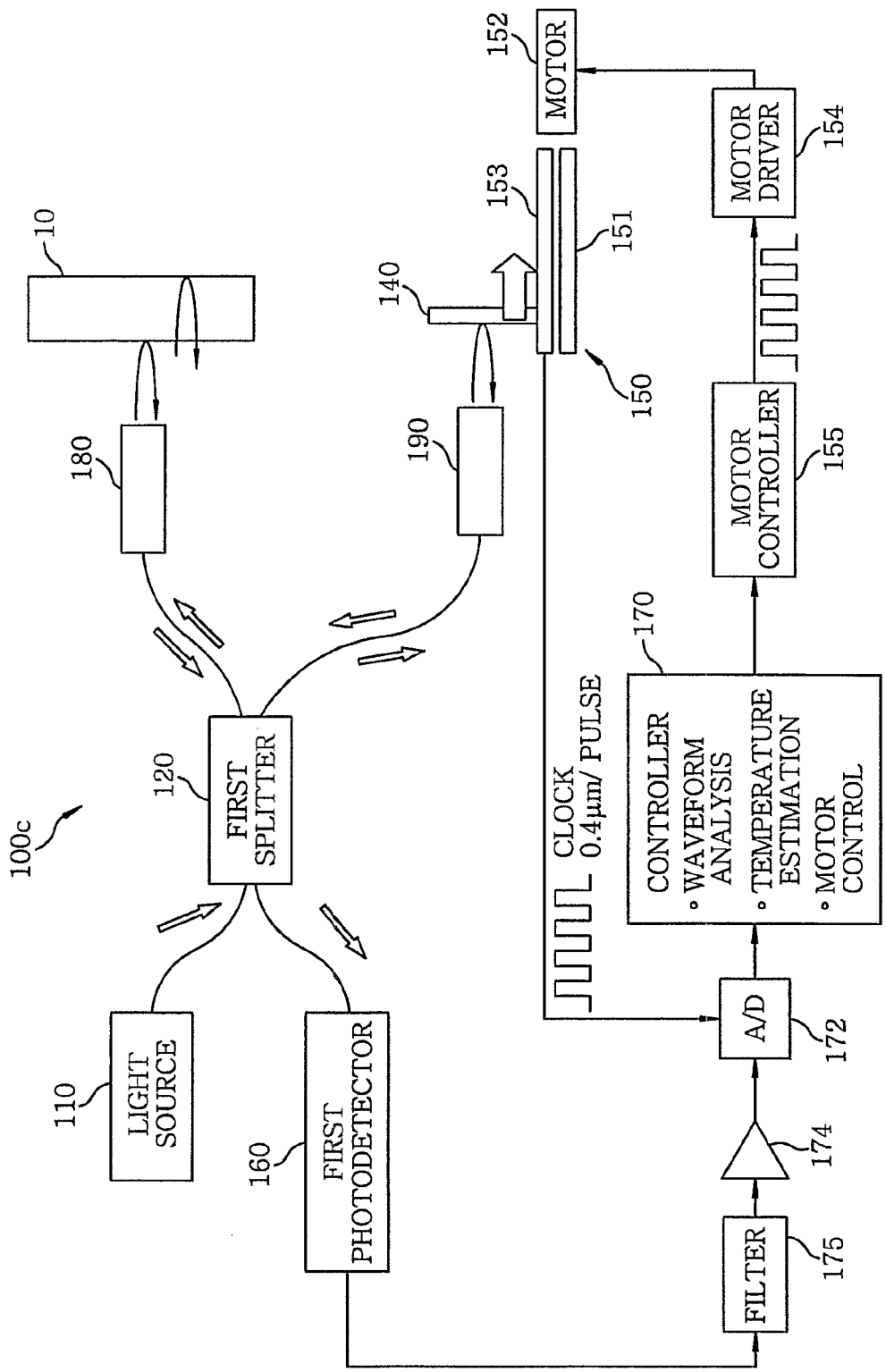
FIG. 6 is a block diagram showing the schematic construction of a temperature measurement apparatus according to a fourth embodiment of the present invention.

FIG. 6 is a diagram showing the construction of a temperature measurement apparatus 100c according to a fourth embodiment of the present invention. The temperature measurement apparatus 100c is configured such that the output signal of a first photodetector 160 is input to an amplifier 171 via a filter 175, and then is input to a controller 170 via an A/D converter 172. The filter 175 is an analog filter for eliminating the above-described noise components whose frequencies are lower than that of an interference wave.

The filter 175 may be configured to perform one of the followings: cutting off frequency components whose frequencies are lower than those of noises caused by the operation of the optical path length adjustor 150; selectively allowing only such frequency components whose frequencies are higher than that of an interference wave between a reflected measurement beam and a reflected reference beam to pass therethrough; and selectively allowing only such frequency band components corresponding to the frequency of the interference wave between the reflected measurement beam and the reflected reference beam to pass therethrough.

The temperature measurement apparatus 100c configured as above can be implemented at a low cost by a relatively simple construction, without having to provide the second splitter 121 and the second photodetector 161 as in the temperature measurement apparatus 100 of FIG. 1. Further, the temperature measurement apparatus 100c can measure temperature with higher accuracy by eliminating noise components occurring due to the operation of the optical path length adjustor 150.

Figure 7:
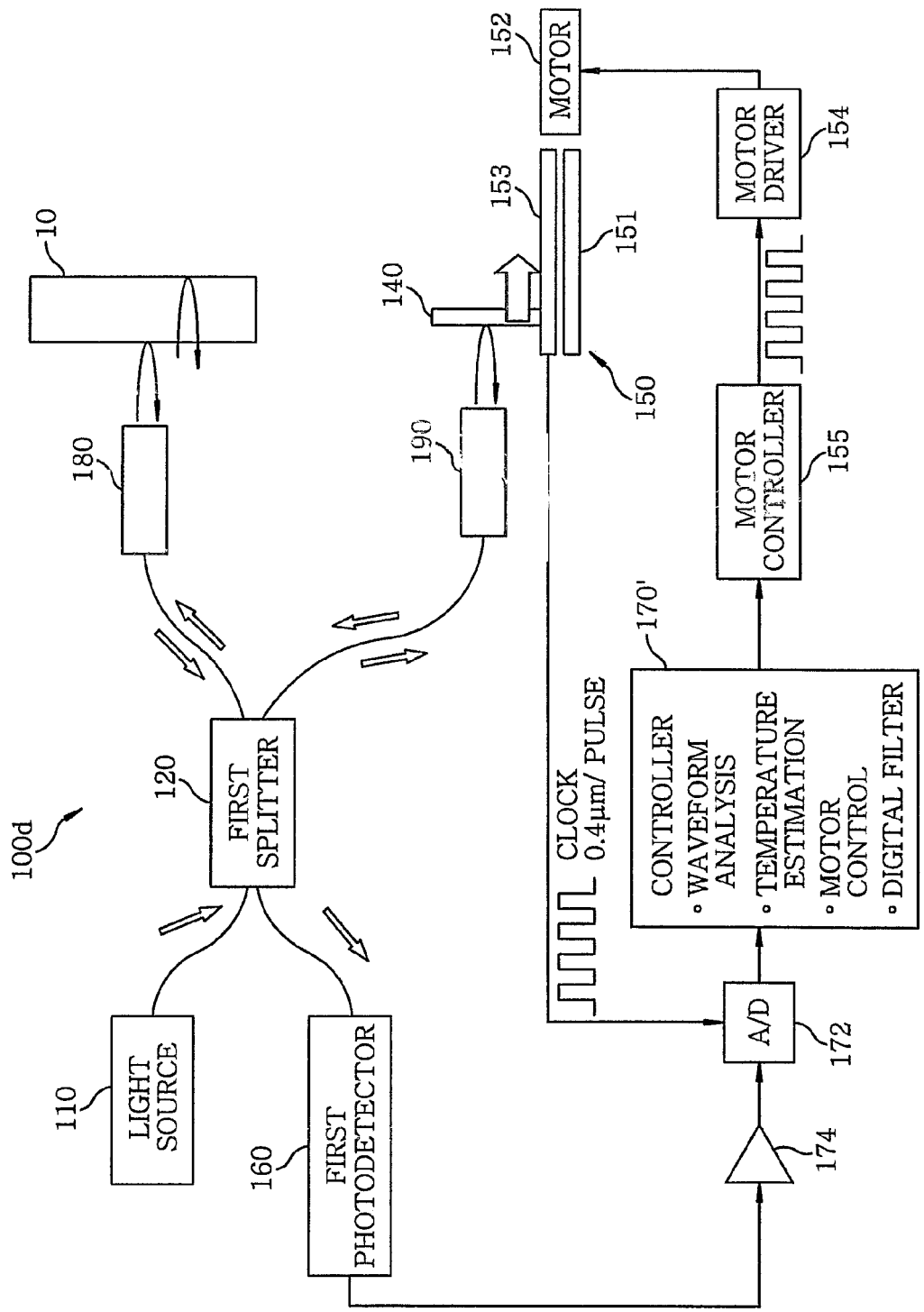
FIG. 7 is a block diagram showing the schematic construction of a temperature measurement apparatus according to a fifth embodiment of the present invention.

FIG. 7 is a diagram showing the construction of a temperature measurement apparatus 100d according to a fifth embodiment of the present invention. The temperature measurement apparatus 100d is configured such that the function of a digital filter is provided in a controller 170', instead of providing the filter 175 shown in FIG. 6. In this case as well, the same effects as those of the temperature measurement apparatus 100c using the analog filter of the fourth embodiment can be achieved.

While the invention has been shown and described with respect to the preferred embodiment, it will be understood by those skilled in the art that various changes and modifications may be made without departing from the scope of the invention as defined in the following claims.

What is claimed is:

1. A temperature measurement method, comprising:
splitting a low coherence light beam into a reference beam and a measurement beam;
radiating the reference beam onto a reference beam reflector while radiating the measurement beam onto a target object;
measuring an interference between the reference beam reflected from the reference beam reflector and the measurement beam reflected from the target object while changing an optical path length of the reflected reference beam by moving the reference beam reflector in one direction; and
subtracting a signal, obtained when only the reflected reference beam is detected while the optical path length of the reflected reference beam is changed, from a signal obtained from the interference measurement, calculating a location of the interference by the subtraction, and calculating a temperature of the target object from the calculated location of the interference.

2. The temperature measurement method of claim 1, wherein a center wavelength of the low coherence light beam ranges from 0.3 μm to 20 μm and a coherence length of the low coherence light beam ranges from 0.1 μm to 100 μm.

* * * * *